(12) United States Patent
Shayevitz et al.

(10) Patent No.: US 12,130,724 B2
(45) Date of Patent: Oct. 29, 2024

(54) CLOSED CHASSIS DEBUGGING THROUGH TUNNELING

(71) Applicant: Intel Corporation, Santa Clara, CA (US)

(72) Inventors: Gilad Shayevitz, Olesh (IL); Tsvika Kurts, Haifa (IL); Vladislav Kopzon, Haifa (IL); Reuven Rozic, Binyamina (IL); Yaniv Hayat, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 889 days.

(21) Appl. No.: 16/912,545

(22) Filed: Jun. 25, 2020

(65) Prior Publication Data

US 2020/0327041 A1    Oct. 15, 2020

(51) Int. Cl.
*G06F 11/36* (2006.01)
*G06F 11/34* (2006.01)
*G06F 13/38* (2006.01)
*G06F 13/42* (2006.01)

(52) U.S. Cl.
CPC ...... *G06F 11/3636* (2013.01); *G06F 11/3476* (2013.01); *G06F 11/3688* (2013.01); *G06F 11/3692* (2013.01); *G06F 13/385* (2013.01); *G06F 13/4282* (2013.01)

(58) Field of Classification Search
CPC ............. G06F 11/3476; G06F 11/3636; G06F 11/3688; G06F 11/3692; G06F 13/385; G06F 13/4282
See application file for complete search history.

(56) References Cited

U.S. PATENT DOCUMENTS

| 2012/0151263 A1* | 6/2012 | Rentschler | G06F 11/267 714/E11.147 |
| 2013/0077382 A1* | 3/2013 | Cho | G11C 7/10 365/163 |
| 2018/0089115 A1* | 3/2018 | Schmisseur | G06F 13/4282 |
| 2019/0034259 A1* | 1/2019 | Jiang | G06F 11/0787 |
| 2019/0042391 A1* | 2/2019 | Menon | G06F 11/3636 |
| 2019/0102335 A1* | 4/2019 | Tan | G06F 13/4221 |

* cited by examiner

*Primary Examiner* — Ziaul A Chowdhury
(74) *Attorney, Agent, or Firm* — Alliance IP, LLC

(57) ABSTRACT

A system can include a host machine connected to a device under test (DUT) by a serial link. The host machine can include a serial interface, such as a Thunderbolt interface, and a memory. The DUT can include a trace data source, a high-speed trace interface (HTI) to receive trace data from the trace data source, a serial interface (such as a Thunderbolt interface), and a PIPE interface connecting the HTI with the serial interface. The HTI is to send the trace data to the serial interface through the PIPE interface. The serial interface is to packetize the trace data into a conforming packet format, and send the trace data as a packet across the serial link to the host machine. The host machine can receive the trace data at the host-side serial interface, store the trace data in memory, and process the trace data for debugging the DUT.

13 Claims, 9 Drawing Sheets

CLOSED CHASSIS DEBUGGING THROUGH TUNNELING

BACKGROUND

Serial interconnects provide ways for conveying streams of bits from one component to another. With modern computing devices, high-speed serial interconnects are often used to communicatively couple various components together. For example, a computing device may be coupled to a number of peripheral devices (e.g., display, Ethernet hub, auxiliary storage device, or the like) via one or more high-speed interconnects. Examples of such interconnects are Peripheral Component Interconnect Express (PCIe), Universal Serial Bus (USB), DisplayPort (DP), Thunderbolt (TBT), High-speed Trace Interface (HTI), etc.

HTI facilitates the streaming of trace data over the physical layer of standard interfaces, such as PCIe, DP, HDMI, or USB.

DETAILED DESCRIPTION

Figure 1:
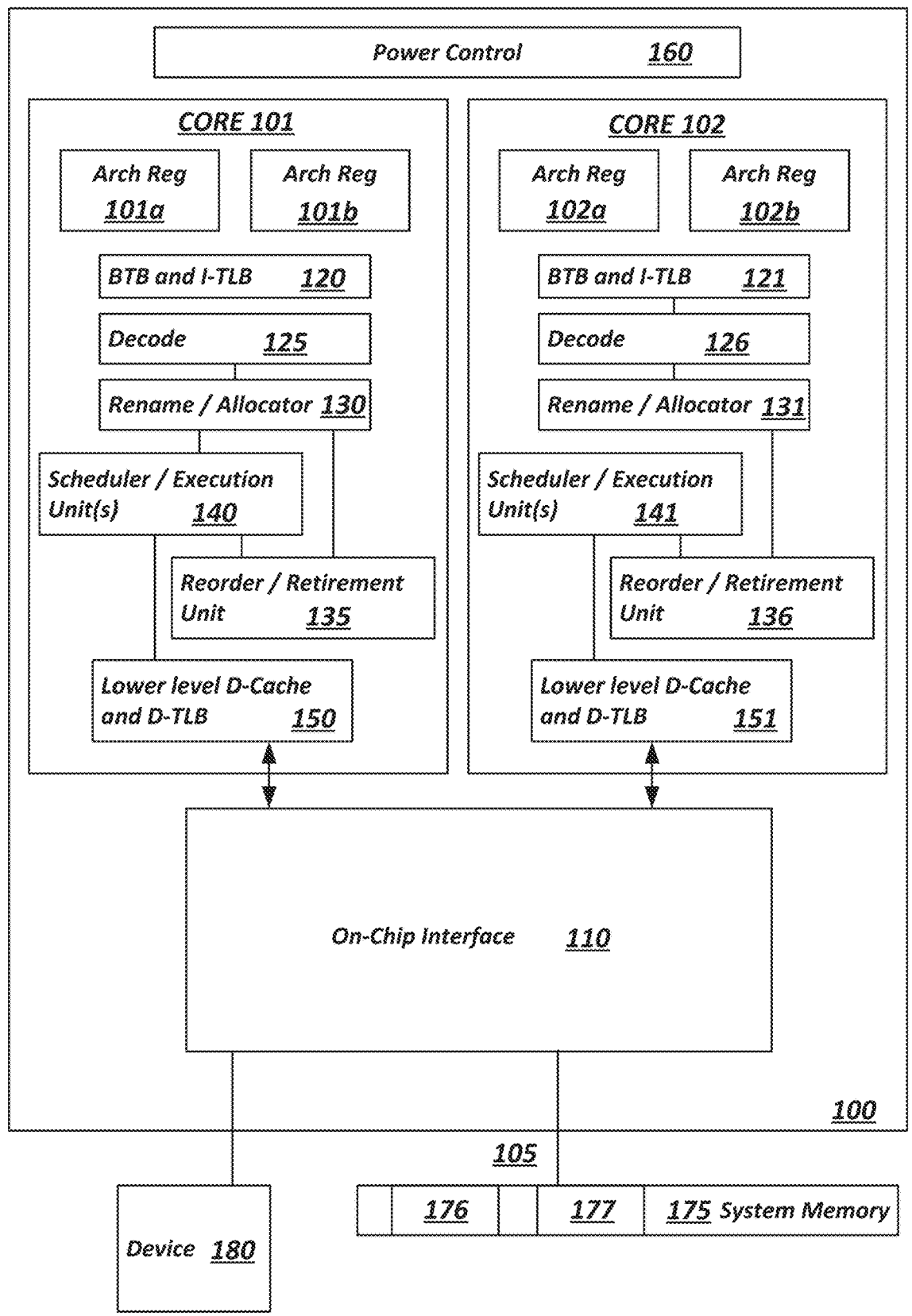
FIG. 1 illustrates an embodiment of a block diagram for a computing system including a multicore processor in accordance with embodiments of the present disclosure.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

This disclosure describes closed chassis debugging of a system under test (SUT) using HTI tunneling through a TBT interface. Closed chassis debug allows for technicians to perform debugging on machines without invasive techniques, such as dismantling the machine's chassis. Instead, a serial interface, such as a USB or DP compliant interface, can be used to mine trace data from the SUT without opening the chassis and probing components directly for trace information for debug or profiling purposes. By tunneling trace data through the TBT interface, a host machine can be connected to a SUT via a serial interconnect, such as those supported by USB4 or higher, and without the need of intermediate hardware, such as a trace box. In addition, a host machine can be connected to any SUT that includes a conforming serial interface, regardless of the platform's configurations (e.g., retimers, redrivers, etc.). In addition, the use of TBT to stream the trace data allows for the stream to continue, at least partially, when the CPU loses power or enters into a low power state.

HTBT can use USB4 building blocks for transmitting debug information across a serial link. HTBT functionality as described herein can support tracing via a USB4 port that implements USB4 using integrated Type-C implementation within CPU. In addition, HTBT keeps the door open for future extensions that will cover other USB4 topologies.

Figure 2:
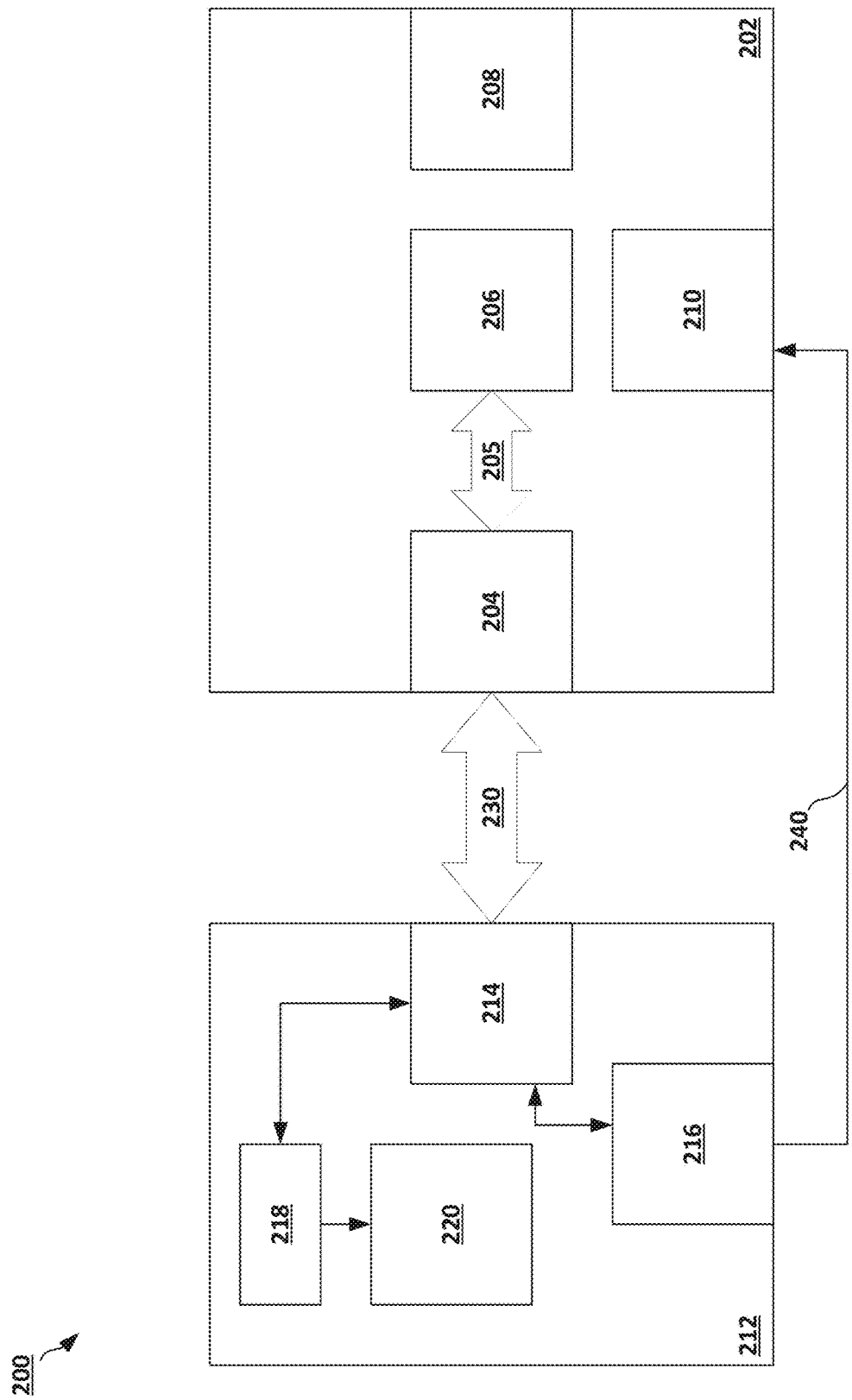
FIG. 2 is a schematic diagram of an example topology that includes a host machine connected to a system under test by a high-speed interconnect in accordance with embodiments of the present disclosure.

FIG. 2 is a schematic diagram of an example topology 200 that includes a host machine 212 connected to a system under test (SUT) 202 by an interconnect 230 in accordance with embodiments of the present disclosure. The example topology 200 facilitates the HTI (Debug port) Tunneling Through Thunderbolt (HTBT). HTBT uses a feature of Thunderbolt Host-to-Host Tunneling. Host-to-Host tunneling enables connection of two Thunderbolt devices and the transfer data from one to another. The host machine 212 and the SUT 202 of FIG. 2 include such Thunderbolt devices.

HTBT directs debug data or trace data for processor core from an SUT 202 to a host machine 212 using Host-to-Host tunneling. Instead of sending data from a DRAM of a processor to a trace box, the trace data is sent from HTI 206 via a Physical Interface for PCI Express (PIPE) 205 that connects HTI 206 to a Thunderbolt device 204. The data will be transferred using a Thunderbolt (or other USB4-compliant) link 230 into the host machine 212 and will be stored in its memory 218 (e.g., DRAM) for processing.

The system under test (SUT) 202 can be a computing device, such as a laptop computer, desktop computer, tablet computer, mobile device, or other type of computing device. In some embodiments, the SUT 202 can be referred to as a target system (TS) 202. The SUT 202 includes a processor core 208. Processor core 208 can include one or more hardware processors. Processor core 208 can also be referred to as a CPU or simply as a processor. The processor core 208 can be considered a trace data source, which is a source of trace data that is sent across the link 230 for analysis by the host machine 212.

The SUT 202 also includes high-speed trace interface (HTI) logic 206. HTI logic 206 can be implemented in hardware, software, or a combination of hardware and software. HTI logic 206 can provide a debug information export interface to extract debug information, such as trace data. The debug information that the HTI logic 206 can extract includes, but is not limited to, information pertaining to CPU and other operations. The following list provides some examples:

Power: Pcode power commands, VR (Voltage Regulator) responses, thermal info, Package and Core C state residency and more;

Ring: All Ring transaction, Core and Thread ID, GT (Graphic) transaction on the Ring. Cache attributes. SE (Secure Enclave) range transactions;

DDR: Memory reads/writes at a signal lever, which can replace Logic Analyzer such as row address (RAS), column address (CAS), and command (CMD);

OPI: On die Package Interconnect. This is the bus which replaces DMI;

AET: Architecture Event Trace provide, provides Architecture event profile. Such as WRMSR, RDMSR, Core Power events (CPD), Interrupts; and Processor Tracing (PT): Trace of actual Branches taken and program execution, which can be used for software analysis and debugging.

In general, the HTI logic 206 can include an HTI link layer and an HTI PHY. The HTI link layer can include circuitry to convert parallel data source (e.g., trace data from the processor core 208) into symbols suitable for input to the PHY layer serializer. The link layer distributes the data among an implementation-specific number of lanes and provides a link format sufficient to re-join the lanes at the receive side in the host machine 212.

The HTI PHY layer includes electrical and clocking characteristics. The HTI PHY includes tolerances of the PHY transmitter, the supported clock configurations and interoperability. The functions of the HTI PHY include serialization, power sequencing, and clocking, among other things.

The SUT 202 can also include a Thunderbolt (TBT) interface 204. The TBT interface can be a hardware device that includes an externally facing port, such as a USB Type-C port. In embodiments, the TBT interface 204 can be implementation specific, and other types of USB4-compliant serial interconnects can also be used. In this example embodiment, the TBT interface 204 is described. For example, in this example, TBT 3 can be used, which uses a Universal Serial Bus (USB) Type-C connector. TBT 3 can support up to 40 GT/s. TBT 3 can use PCIe protocols, DisplayPort protocols, and/or USB protocols for the creation and transmission of packets across a link.

A PIPE interface 205 interconnects the HTI logic 206 with the TBT interface 204. The PIPE interface 205 is a dedicated interface for the extraction of debug information. The PIPE interface 205 can be used to send debug information from the HTI logic 206 into Thunderbolt interface hardware 204. Thunderbolt IP when running in HTBT mode will route this data through its side port (Called Null port) component as if it was coming from DRAM and will tunnel it through Type-C port.

Figure 3:
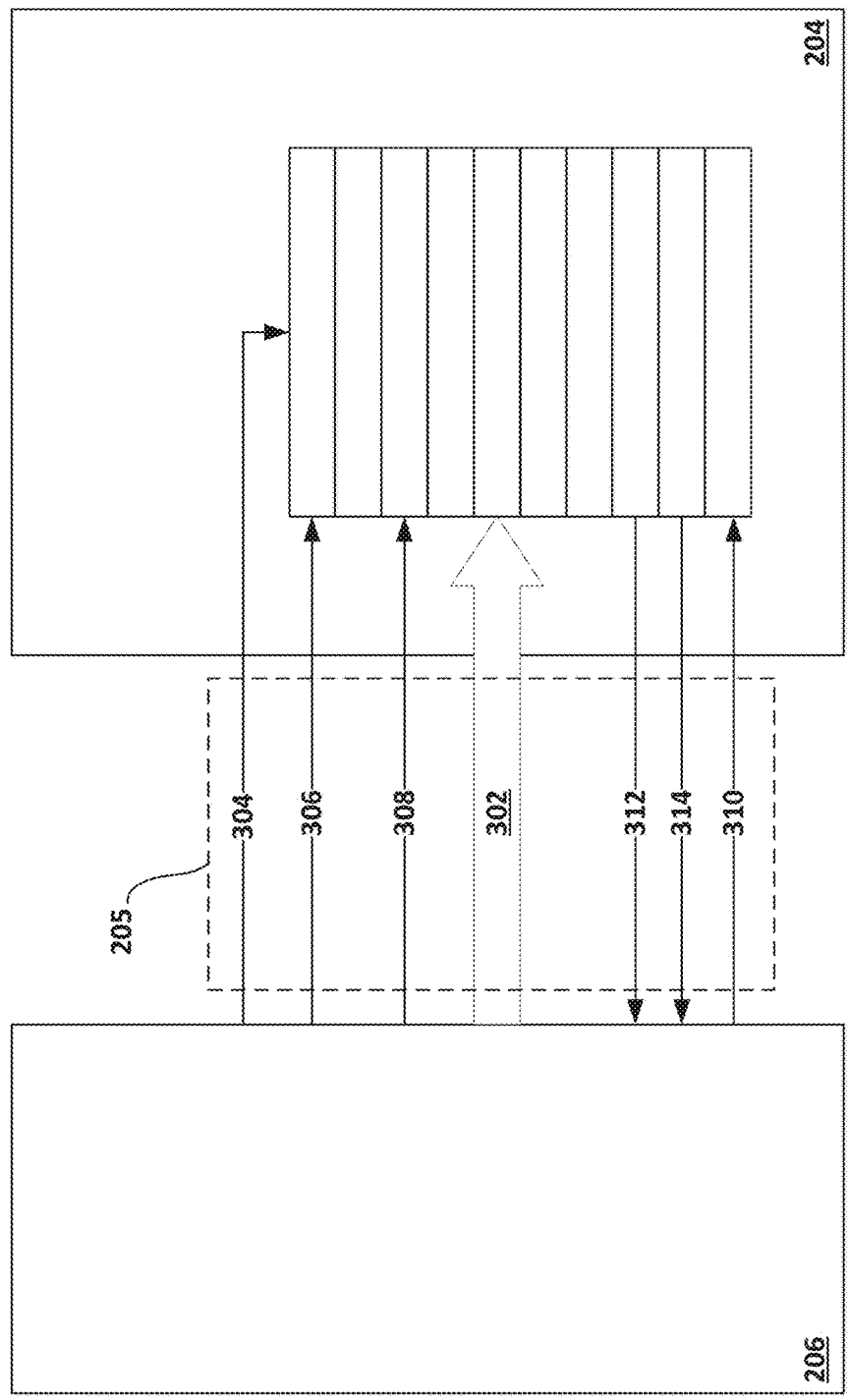
FIG. 3 is a schematic diagram of an example PIPE interface between a High-speed Trace Interface (HTI) device and a Thunderbolt (TBT) device within a system under test in accordance with embodiments of the present disclosure.

FIG. 3 is a schematic diagram 300 of an example PIPE interface 205 between a Thunderbolt (TBT) interface 204 and a High-speed Trace Interface (HTI) device 206 within a system under test in accordance with embodiments of the present disclosure. The PIPE interface 205 is dedicated for exporting trace and other debug information. The PIPE interface 205 is used to send the trace and other debug information from the HTI logic 206 into the Thunderbolt hardware 204. Thunderbolt internet protocols, when running in HTBT mode, will route the trace and other debug data through its side port (e.g., Null port) component as if it was coming from DRAM and will tunnel the data through the Type-C port.

The PIPE interface 205 can include a data bus 302. The data bus 302 can be used by the HTI logic 206 to send the trace and other debug information to the TBT hardware 204. The PIPE interface 205 can also include a signal line for a clock 304. The clock 304 can be used by HTI logic 206 to drive the interface, including the data. The clock 304 can drive the HTBT logic in Thunderbolt. The PIPE interface 205 can also include a signal line for a reset 306. The reset 308 can provide a reset indication for Thunderbolt to reset all HTBT logic.

The PIPE interface 205 can also include a signal line for a valid indicator 310. The valid indicator 310 indicates that the data driven on a cycle is valid. The valid indicator can be used by the TBT hardware 204 to sample the data bus 302.

The PIPE interface 205 can include a signal line for a Trace_active signal 310. The Trace_active signal 310 can be used by the HTI logic 206 to indicate to the TBT hardware 204 that the HTI logic 206 has trace information. The TBT hardware 204 can initiate the link with the host machine 212 in response to receiving the Trace_active signal 310.

The PIPE interface 205 can also include a signal line for a Link_ready signal 312. The Link_ready signal 312 is used by the TBT hardware 204 to indicate to the HTI logic 206 that the link to the host machine 212 is ready. The Link_ready signal 312 can be sent by the TBT hardware 204 as a response to the Trace_active signal 310. Once the link to the host machine 212 is ready, data can be sent and tunneled to the host machine 212. The PIPE interface 205 can also include a PIPE Credit return signal 314. In some embodiments, the HTI logic 206 and the TBT hardware 204 can use a credit control mechanism. The HTI logic 206 will drive new trace and other debug data only if the HTI logic 206 has credits. The TBT hardware 204 can indicate a release of a credit using the PIPE Credit return signal 314.

Returning to FIG. 2, the TBT hardware 204 can prepare the trace and other debug information for transmission across a serial link, such as a TBT-compliant link or a USB4-compliant link. The TBT hardware 204 can serialize and packetize the trace and debug information, and send the data using a side port component through, e.g., a Type-C connector to a host machine 212.

The host machine 212 can function as a debug host or debug and test system (DTS). For HTBT functionality, the host machine 212 can function as a receiver Host in a TBT Host-to-Host topology. The host machine 212 can be a computing device, such as a laptop computer, desktop computer, tablet computer, or other type of computing device. The host machine 212 can receive trace data and/or other debug information via the link 230 into a host-side TBT interface 214.

Host-side TBT interface 214 can include a port, such as a Type-C port, for receiving information across a serial link. The host-side TBT interface 214 can prepare the incoming packets for storage in memory 218. The host-side TBT interface 214 can receive the trace data and/or other debug information from the SUT 202. The host-side TBT interface 214 can store the trace data and/or other debug information in memory 218. Memory 218 can be a random access memory, such as a DRAM or other type of memory.

The host machine 212 can include an HTI driver 216. HTI driver 216 can configure the link 230 and can configure the SUT 202 for operating in trace tunneling mechanisms described herein. The HTI driver 216 can be extension of a driver used for the Host-to-Host feature. The SUT 202 can include a sideband fabric 210. The sideband fabric 210 can be connected to the HTI driver 216 by a sideband channel 240. Sideband channel 240 can be a JTAG link or other type of link. In some embodiments, the HTI driver 216 can use the sideband fabric 210 to configure the SUT 202 for HTBT functionality.

Once the trace data and/or other information is stored in memory 218, the trace data and/or other debug information can be processed by debug tool 220. Debug tool 220 can be any type of debugging and analysis tool, such as those used to analyze and diagnose debug data.

Figure 4:
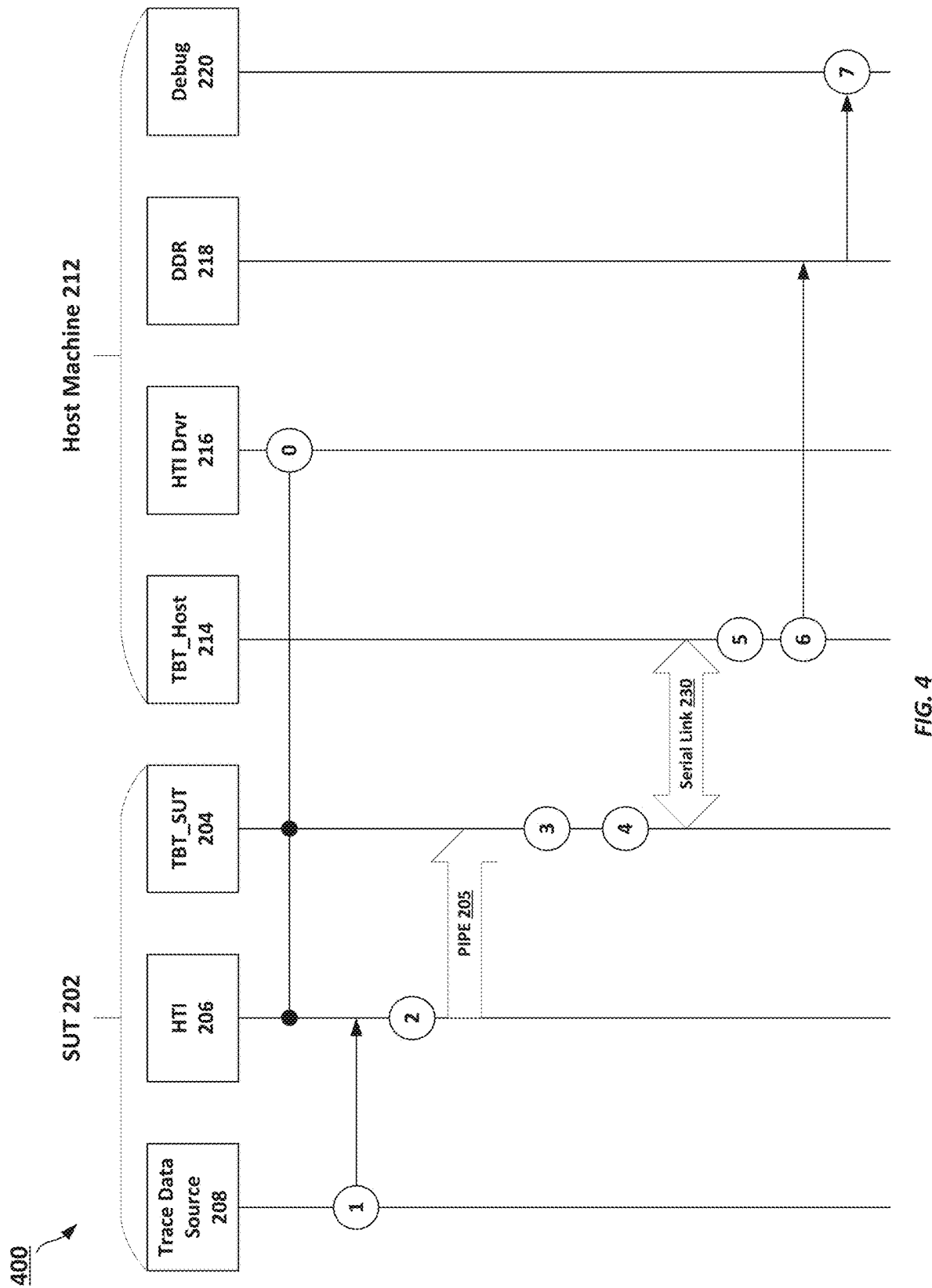
FIG. 4 is a swim lane diagram illustrating an example process flow between a system under test and a host machine in accordance with embodiments of the present disclosure.

FIG. 4 is a swim lane diagram 400 illustrating an example process flow between a system under test (SUT) 202 and a host machine 212 in accordance with embodiments of the present disclosure. (0): At the outset, the host machine 212 can be linked to a SUT 202 via a serial link 230. The host machine 212 can include HTI driver 216 that can configure various components of SUT 202 for HTI tunneling through Thunderbolt (HTBT) functionality. For example, the HTI driver 216 can configure the HTI logic 206 and the TBT interface 204 for HTBT operation.

(1): The HTI logic 206 can receive trace data and/or other debug information from a trace data source 208. Trace data source 208 can be a CPU, processor core, operating system, or other source of trace data.

(2): The HTI 206 can send the trace data to the TBT interface 204 using the HTBT PIPE interface 205 per the signaling described in FIG. 3 above.

(3): The TBT interface 204 can serialize and packetize the trace data in a format compliant with TBT and/or USB4 or other serial link protocols. (4): The TBT interface 204 can then send the trace data across a serial link 230, such as a link compliant with TBT or USB4.

(5): The TBT interface 214 at the host can receive the trace data and depacketize the trace data. (6): The TBT interface 214 can then store the trace data in memory 218. (7): The debug software 220 at the host machine 212 can then consume, process, analyze, etc., the trace data stored in memory 218.

Figure 5:
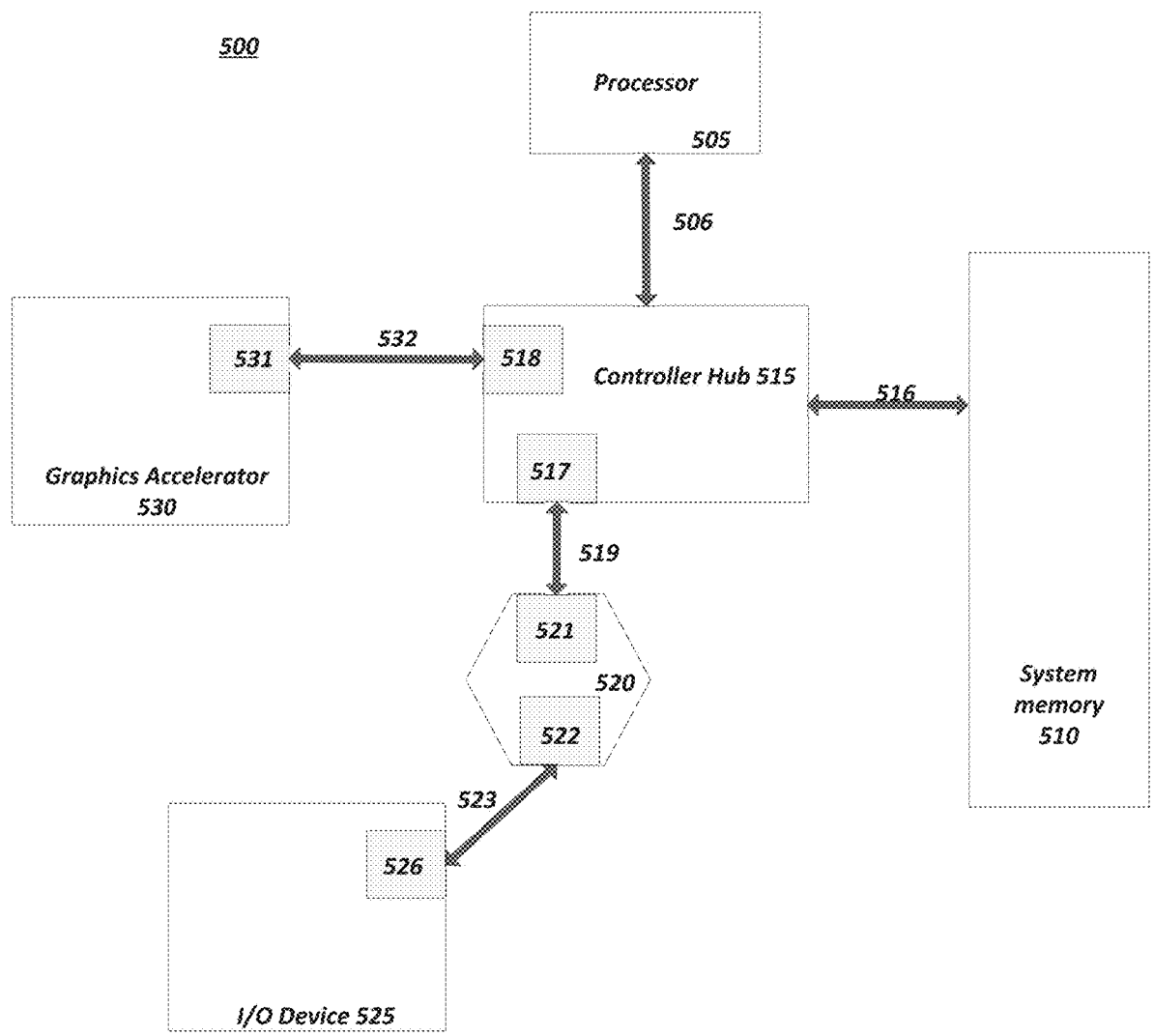
FIG. 5 illustrates an embodiment of a computing system including an interconnect architecture in accordance with embodiments of the present disclosure.

Referring to FIG. 5, an embodiment of a fabric composed of point-to-point Links that interconnect a set of components is illustrated. System 500 includes processor 505 and system memory 510 coupled to controller hub 515. Processor 505 includes any processing element, such as a microprocessor, a host processor, an embedded processor, a co-processor, or other processor. Processor 505 is coupled to controller hub 515 through front-side bus (FSB) 506. In one embodiment, FSB 506 is a serial point-to-point interconnect as described below. In another embodiment, link 506 includes a serial, differential interconnect architecture that is compliant with different interconnect standard.

System memory 510 includes any memory device, such as random access memory (RAM), non-volatile (NV) memory, or other memory accessible by devices in system 500. System memory 510 is coupled to controller hub 515 through memory interface 516. Examples of a memory interface include a double-data rate (DDR) memory interface, a dual-channel DDR memory interface, and a dynamic RAM (DRAM) memory interface.

In one embodiment, controller hub 515 is a root hub, root complex, or root controller in a Peripheral Component Interconnect Express (PCIe or PCIE) interconnection hierarchy. Examples of controller hub 515 include a chipset, a memory controller hub (MCH), a northbridge, an interconnect controller hub (ICH) a southbridge, and a root port controller/hub. Often the term chipset refers to two physically separate controller hubs, i.e. a memory controller hub (MCH) coupled to an interconnect controller hub (ICH). Note that current systems often include the MCH integrated with processor 505, while controller 515 is to communicate with I/O devices, in a similar manner as described below. In some embodiments, peer-to-peer routing is optionally supported through root complex 515.

Here, controller hub 515 is coupled to switch/bridge 520 through serial link 519. Input/output modules 517 and 521, which may also be referred to as interfaces/ports 517 and 521, include/implement a layered protocol stack to provide communication between controller hub 515 and switch 520. In one embodiment, multiple devices are capable of being coupled to switch 520.

Switch/bridge 520 routes packets/messages from device 525 upstream, i.e. up a hierarchy towards a root complex, to controller hub 515 and downstream, i.e. down a hierarchy away from a root port controller, from processor 505 or system memory 510 to device 525. Switch 520, in one embodiment, is referred to as a logical assembly of multiple virtual PCI-to-PCI bridge devices. Device 525 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 525 may include a PCIe to PCI/PCI-X bridge to support legacy or other version PCI devices. Endpoint devices in PCIe are often classified as legacy, PCIe, or root complex integrated endpoints.

Graphics accelerator 530 is also coupled to controller hub 515 through serial link 532. In one embodiment, graphics accelerator 530 is coupled to an MCH, which is coupled to an ICH. Switch 520, and accordingly I/O device 525, is then coupled to the ICH. I/O modules 531 and 518 are also to implement a layered protocol stack to communicate between graphics accelerator 530 and controller hub 515. Similar to the MCH discussion above, a graphics controller or the graphics accelerator 530 itself may be integrated in processor 505.

Figure 6:
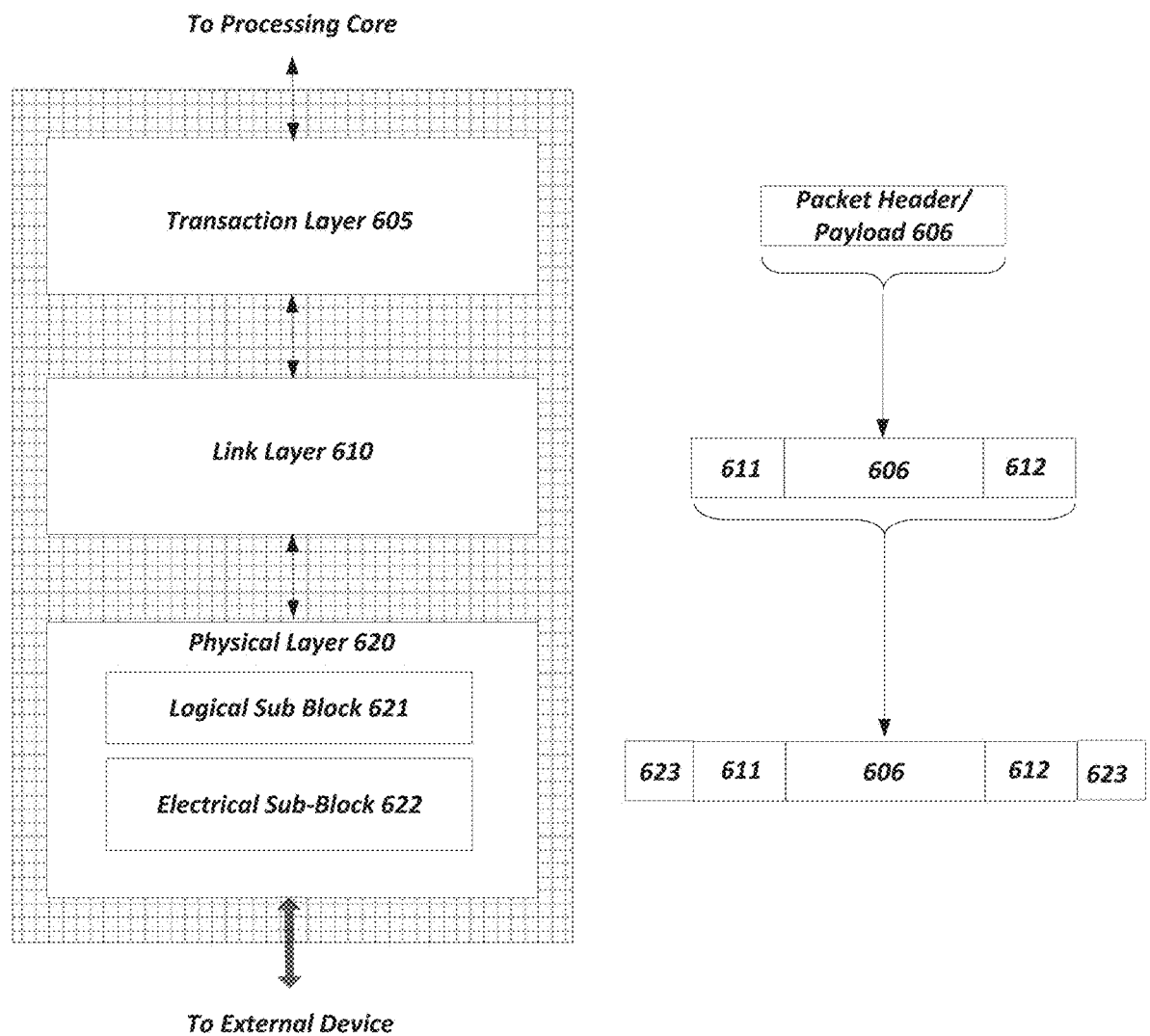
FIG. 6 illustrates an embodiment of an interconnect architecture including a layered stack in accordance with embodiments of the present disclosure.

Turning to FIG. 6 an embodiment of a layered protocol stack is illustrated. Layered protocol stack 600 includes any form of a layered communication stack, such as a Quick Path Interconnect (QPI) stack, a PCIe stack, a next generation high performance computing interconnect stack, or other layered stack. Although the discussion immediately below in reference to FIGS. 5-8 are in relation to a PCIe stack, the same concepts may be applied to other interconnect stacks. In one embodiment, protocol stack 600 is a PCIe protocol stack including transaction layer 605, link layer 610, and physical layer 620. An interface, such as interfaces 517, 518, 521, 522, 526, and 531 in FIG. 5, may be represented as communication protocol stack 600. Representation as a communication protocol stack may also be referred to as a module or interface implementing/including a protocol stack.

PCI Express uses packets to communicate information between components. Packets are formed in the Transaction Layer 605 and Data Link Layer 610 to carry the information from the transmitting component to the receiving component. As the transmitted packets flow through the other layers, they are extended with additional information necessary to handle packets at those layers. At the receiving side the reverse process occurs and packets get transformed from their Physical Layer 620 representation to the Data Link Layer 610 representation and finally (for Transaction Layer Packets) to the form that can be processed by the Transaction Layer 705 of the receiving device.

Transaction Layer

In one embodiment, transaction layer 605 is to provide an interface between a device's processing core and the interconnect architecture, such as data link layer 610 and physical layer 620. In this regard, a primary responsibility of the transaction layer 605 is the assembly and disassembly of packets (i.e., transaction layer packets, or TLPs). The translation layer 605 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 605. An external device at the opposite end of the link, such as controller hub 515 in FIG. 5, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 605 assembles packet header/payload 606. Format for current packet headers/payloads may be found in the PCIe specification at the PCIe specification website.

Figure 7:
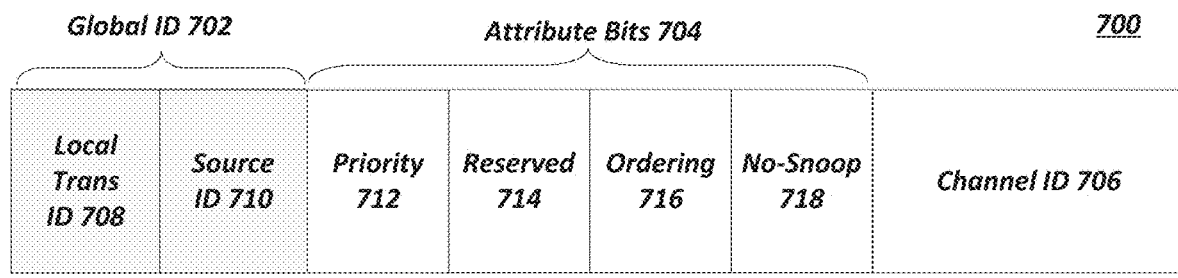
FIG. 7 illustrates an embodiment of a request or packet to be generated or received within an interconnect architecture in accordance with embodiments of the present disclosure.

Quickly referring to FIG. 7, an embodiment of a PCIe transaction descriptor is illustrated. In one embodiment, transaction descriptor 700 is a mechanism for carrying transaction information. In this regard, transaction descriptor 700 supports identification of transactions in a system. Other potential uses include tracking modifications of default transaction ordering and association of transaction with channels.

Transaction descriptor 700 includes global identifier field 702, attributes field 904, and channel identifier field 706. In the illustrated example, global identifier field 702 is depicted comprising local transaction identifier field 708 and source identifier field 710. In one embodiment, global transaction identifier 702 is unique for all outstanding requests.

According to one implementation, local transaction identifier field 708 is a field generated by a requesting agent, and it is unique for all outstanding requests that require a completion for that requesting agent. Furthermore, in this example, source identifier 710 uniquely identifies the requestor agent within a PCIe hierarchy. Accordingly, together with source ID 710, local transaction identifier 708 field provides global identification of a transaction within a hierarchy domain.

Attributes field 704 specifies characteristics and relationships of the transaction. In this regard, attributes field 704 is potentially used to provide additional information that allows modification of the default handling of transactions. In one embodiment, attributes field 704 includes priority field 712, reserved field 714, ordering field 716, and no-snoop field 718. Here, priority sub-field 712 may be modified by an initiator to assign a priority to the transaction. Reserved attribute field 714 is left reserved for future, or vendor-defined usage. Possible usage models using priority or security attributes may be implemented using the reserved attribute field.

In this example, ordering attribute field 716 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 718 is utilized to determine if transactions are snooped. As shown, channel ID Field 706 identifies a channel that a transaction is associated with.

Link Layer

Link layer 610, also referred to as data link layer 610, acts as an intermediate stage between transaction layer 605 and the physical layer 620. In one embodiment, a responsibility of the data link layer 610 is providing a reliable mechanism for exchanging Transaction Layer Packets (TLPs) between two components a link. One side of the Data Link Layer 610 accepts TLPs assembled by the Transaction Layer 605, applies packet sequence identifier 611, i.e. an identification number or packet number, calculates and applies an error detection code, i.e. CRC 612, and submits the modified TLPs to the Physical Layer 620 for transmission across a physical to an external device.

Physical Layer

In one embodiment, physical layer 620 includes logical sub block 621 and electrical sub-block 622 to physically transmit a packet to an external device. Here, logical sub-block 621 is responsible for the "digital" functions of Physical Layer 621. In this regard, the logical sub-block includes a transmit section to prepare outgoing information for transmission by physical sub-block 622, and a receiver section to identify and prepare received information before passing it to the Link Layer 610.

Physical block 622 includes a transmitter and a receiver. The transmitter is supplied by logical sub-block 621 with symbols, which the transmitter serializes and transmits onto to an external device. The receiver is supplied with serialized symbols from an external device and transforms the received signals into a bit-stream. The bit-stream is de-serialized and supplied to logical sub-block 621. In one embodiment, an 8b/10b transmission code is employed, where ten-bit symbols are transmitted/received. Here, special symbols are used to frame a packet with frames 623. In addition, in one example, the receiver also provides a symbol clock recovered from the incoming serial stream.

As stated above, although transaction layer 605, link layer 610, and physical layer 620 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 8:
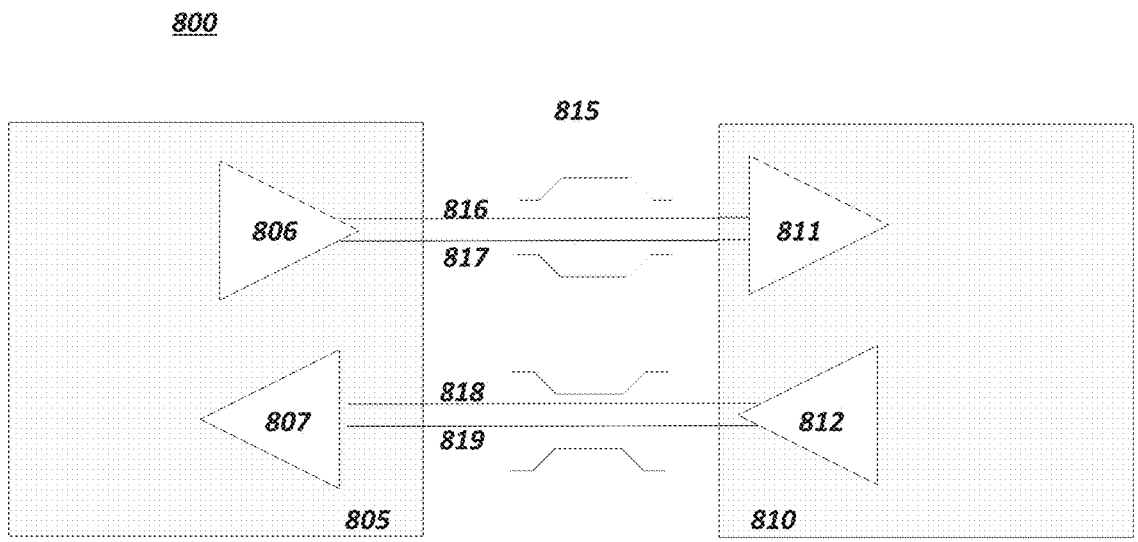
FIG. 8 illustrates an embodiment of a transmitter and receiver pair for an interconnect architecture in accordance with embodiments of the present disclosure.

Referring next to FIG. 8, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 806/811 and a receive pair 812/807. Accordingly, device 805 includes transmission logic 806 to transmit data to device 810 and receiving logic 807 to receive data from device 810. In other words, two transmitting paths, i.e. paths 816 and 817, and two receiving paths, i.e. paths 818 and 819, are included in a PCIe link.

A transmission path refers to any path for transmitting data, such as a transmission line, a copper line, an optical line, a wireless communication channel, an infrared communication link, or other communication path. A connection between two devices, such as device 805 and device 810, is referred to as a link, such as link 815. A link may support one lane —each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 816 and 817, to transmit differential signals. As an example, when line 816 toggles from a low voltage level to a high voltage level, i.e. a rising edge, line 817 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus, methods, and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 9:
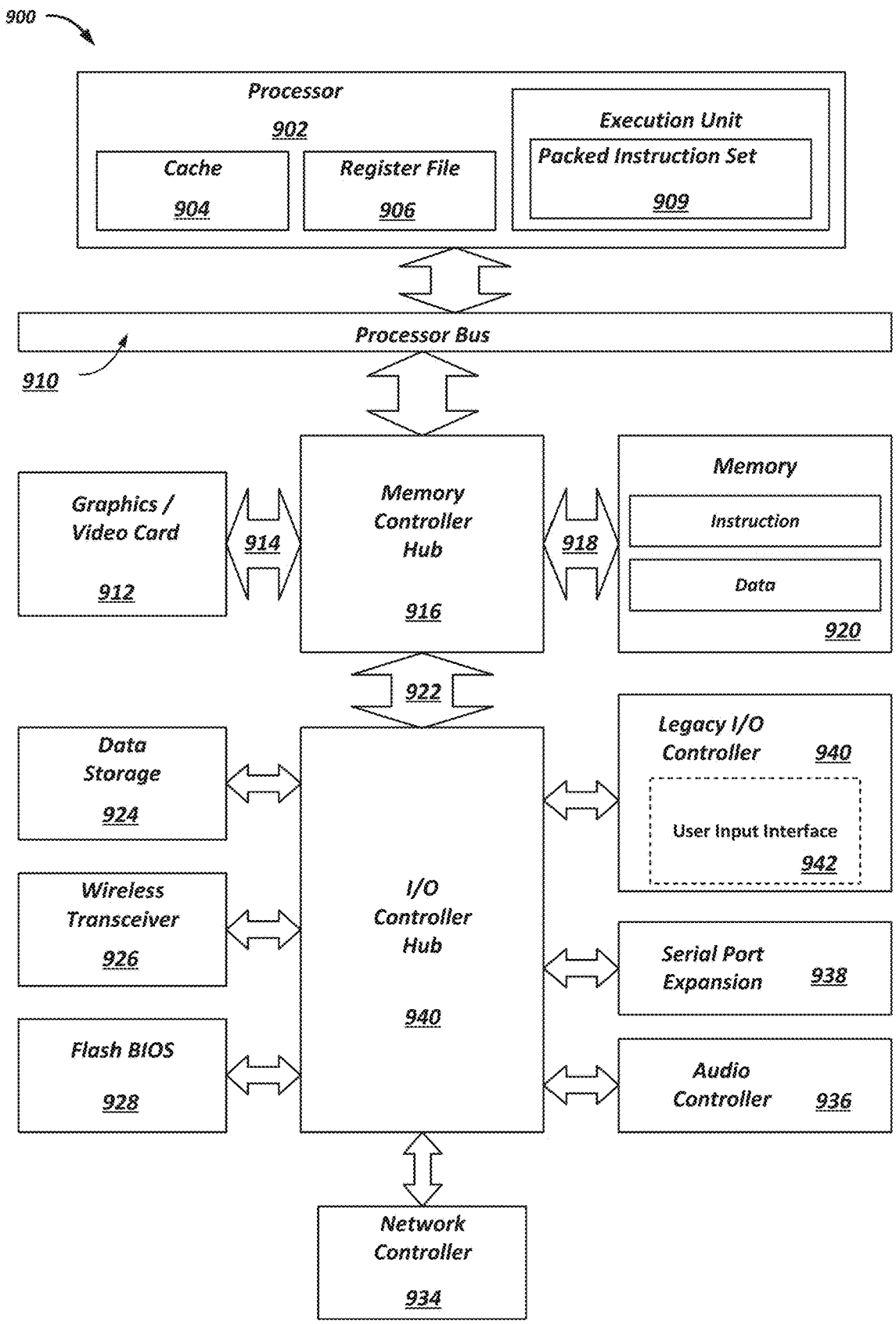
FIG. 9 illustrates another embodiment of a block diagram for a computing system including a processor in accordance with embodiments of the present disclosure.

Turning to FIG. 9, a block diagram of an exemplary computer system formed with a processor that includes execution units to execute an instruction, where one or more of the interconnects implement one or more features in accordance with one embodiment of the present disclosure is illustrated. System 900 includes a component, such as a processor 902 to employ execution units including logic to perform algorithms for process data, in accordance with the present disclosure, such as in the embodiment described herein. System 900 is representative of processing systems based on the PENTIUM III™, PENTIUM 4™, Xeon™, Itanium, XScale™ and/or StrongARM™ microprocessors available from Intel Corporation of Santa Clara, California, although other systems (including PCs having other microprocessors, engineering workstations, set-top boxes and the like) may also be used. In one embodiment, sample system 1000 executes a version of the WINDOWS™ operating system available from Microsoft Corporation of Redmond, Washington, although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 902 includes one or more execution units 1008 to implement an algorithm that is to perform at least one instruction. One embodiment may be described in the context of a single processor desktop or server system, but alternative embodiments may be included in a multiprocessor system. System 900 is an example of a 'hub' system architecture. The computer system 900 includes a processor 902 to process data signals. The processor 902, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 902 is coupled to a processor bus 910 that transmits data signals between the processor 902 and other components in the system 900. The elements of system 900 (e.g. graphics accelerator 912, memory controller hub 916, memory 920, I/O controller hub 924, wireless transceiver 926, Flash BIOS 1028, Network controller 934, Audio controller 936, Serial expansion port 938, I/O controller 940, etc.) perform their conventional functions that are well known to those familiar with the art.

In one embodiment, the processor 902 includes a Level 1 (L1) internal cache memory 904. Depending on the architecture, the processor 902 may have a single internal cache or multiple levels of internal caches. Other embodiments include a combination of both internal and external caches depending on the particular implementation and needs. Register file 906 is to store different types of data in various registers including integer registers, floating point registers, vector registers, banked registers, shadow registers, checkpoint registers, status registers, and instruction pointer register.

Execution unit 908, including logic to perform integer and floating point operations, also resides in the processor 902. The processor 902, in one embodiment, includes a microcode (ucode) ROM to store microcode, which when executed, is to perform algorithms for certain macroinstructions or handle complex scenarios. Here, microcode is potentially updateable to handle logic bugs/fixes for processor 902. For one embodiment, execution unit 908 includes logic to handle a packed instruction set 909. By including the packed instruction set 909 in the instruction set of a general-purpose processor 902, along with associated circuitry to execute the instructions, the operations used by many multimedia applications may be performed using packed data in a general-purpose processor 902. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 908 may also be used in micro controllers, embedded processors, graphics devices, DSPs, and other types of logic circuits. System 900 includes a memory 920. Memory 1020 includes a dynamic random access memory (DRAM) device, a static random access memory (SRAM) device, flash memory device, or other memory device. Memory 920 stores instructions and/or data represented by data signals that are to be executed by the processor 902.

Note that any of the aforementioned features or aspects of the disclosure may be utilized on one or more interconnect illustrated in FIG. 9. For example, an on-die interconnect (ODI), which is not shown, for coupling internal units of processor 902 implements one or more aspects of the disclosure described above. Or the disclosure is associated with a processor bus 910 (e.g. Intel Quick Path Interconnect (QPI) or other known high performance computing interconnect), a high bandwidth memory path 918 to memory 920, a point-to-point link to graphics accelerator 912 (e.g. a Peripheral Component Interconnect express (PCIe) compliant fabric), a controller hub interconnect 922, an I/O or other interconnect (e.g. USB, PCI, PCIe, TBT3) for coupling the other illustrated components. Some examples of such components include the audio controller 936, firmware hub (flash BIOS) 928, wireless transceiver 926, data storage 924, legacy I/O controller 910 containing user input and keyboard interfaces 942, a serial expansion port 938 such as Universal Serial Bus (USB), and a network controller 934. The data storage device 924 can comprise a hard disk drive, a floppy disk drive, a CD-ROM device, a flash memory device, or other mass storage device.

In some embodiments, an Input/Output (I/O) port, such as a USB-C port, may be able to handle not only with USB communication (e.g., USB 3 and/or USB-C communication), but also one or more other types of communication, e.g., Peripheral Component Interconnect Express (PCIe) communication, Thunderbolt (TBT) communication, Display Port (DP) communication, High-Speed Trace Interface (HTI) communication, and/or the like. In some embodiments, a single and configurable physical layer may be coupled to the port, where the physical layer may be configured according to the type of communication to be handled by the port. Furthermore, an adaptor (e.g., which may act as a multiplexer) may selectively couple the port to one of one or more controllers, e.g., based on the type of communication to be handled by the port. Thus, the USB-C port may use a single physical layer and a single adapter, which may be cost effective and consume less area. Other technical effects will be evident from the various embodiments and figures.

Figure 10:
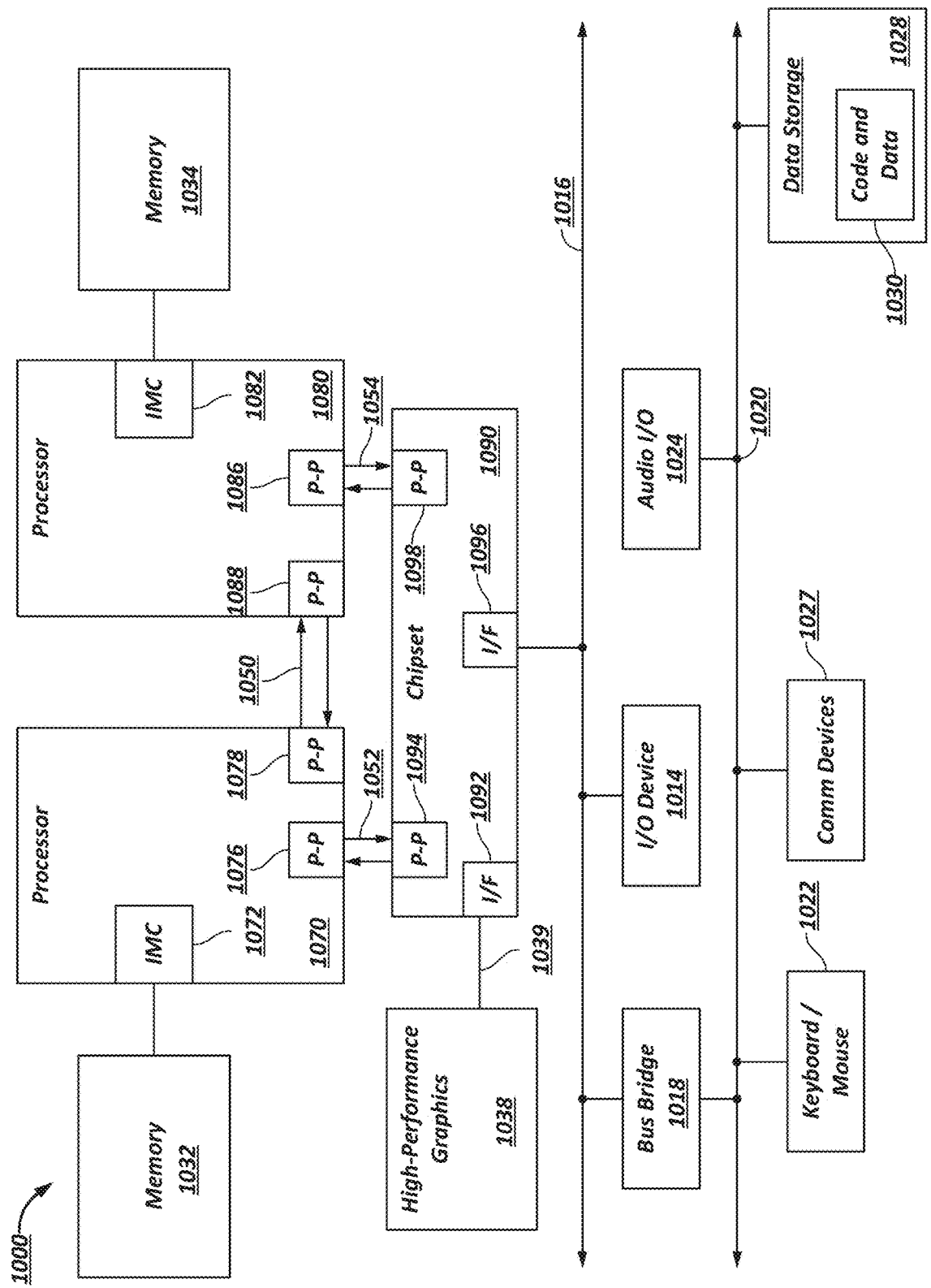
FIG. 10 illustrates an embodiment of a block for a computing system including multiple processor sockets in accordance with embodiments of the present disclosure.

Referring now to FIG. 10, shown is a block diagram of a second system 1000 in accordance with an embodiment of the present disclosure. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of a processor. In one embodiment, 1052 and 1054 are part of a serial, point-to-point coherent interconnect fabric, such as Intel's Quick Path Interconnect (QPI) architecture. As a result, the disclosure may be implemented within the QPI architecture.

While shown with only two processors 1070, 1080, it is to be understood that the scope of the present disclosure is not so limited. In other embodiments, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 each exchange information with a chipset 1090 via individual P-P interfaces 1052, 1054 using point to point interface circuits 1076, 1094, 1086, 1098. Chipset 1090 also exchanges information with a high-performance graphics circuit 1038 via an interface circuit 1092 along a high-performance graphics interconnect 1039.

A shared cache (not shown) may be included in either processor or outside of both processors; yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 are coupled to first bus 1016, along with a bus bridge 1018 which couples first bus 1016 to a second bus 1020. In one embodiment, second bus 1020 includes a low pin count (LPC) bus. Various devices are coupled to second bus 1020 including, for example, a keyboard and/or mouse 1022, communication devices 1027 and a storage unit 1028 such as a disk drive or other mass storage device which often includes instructions/code and data 1030, in one embodiment. Further, an audio I/O 1024 is shown coupled to second bus 1020. Note that other architectures are possible, where the included components and interconnect architectures vary. For example, instead of the point-to-point architecture of FIG. 10, a system may implement a multi-drop bus or other such architecture.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least in part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

In one example, a PCIe physical layer may be utilized to support multiple different protocols. Accordingly, a particular training state in a PCIe LTSSM may be utilized for the negotiation of protocols between devices on a link. As noted above, the protocol determination may occur even before the link trains to an active state (e.g., L0) in the lowest supported data rate (e.g., the PCIe Gen 1 data rate). In one example, the PCIe Config state may be used. Indeed, the PCIe LTSSM may be used to negotiate the protocol by using modified PCIe Training Sets (e.g., TS1 and TS2) after the link width negotiation and (at least partially) in parallel with lane numbering performed during the Config state.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Various aspects and combinations of the embodiments are described above, some of which are represented by the following examples:

Example 1 is an apparatus comprising a computing device, the computing device comprising a source of trace data, the trace data comprising information about the computing device to be used to debug errors associated with the computing device; a high-speed trace interface (HTI) to receive the trace data from the computing device; a serial interface comprising a port, the serial interface interconnected to the HTI by a physical interface; the HTI to send the trace data to the serial interface across the physical interface. The serial interface to serialize the trace data, packetize the trace data into a packet format compliant with the serial interface, and send the trace data as a packet across a serial link via the port.

Example 2 may include the subject matter of example 1, wherein the serial interface comprises one of a Thunderbolt 3 compliant serial interface or a universal serial bus (USB) 4 interface.

Example 3 may include the subject matter of any of examples 1-2, wherein the port comprises a Type-C port.

Example 4 may include the subject matter of any of examples 1-3, wherein the physical interface comprises a Physical Interface for Peripheral Component Interconnect Express (PIPE) interface.

Example 5 may include the subject matter of example 4, wherein the PIPE interface comprises a 64 bit bus, and wherein the HTI sends the trace data to the serial interface via the PIPE interface across the 64 bit bus.

Example 6 may include the subject matter of example 4, wherein the HTI is to transmit a trace active signal to the serial interface, the trace active signal to indicate that trace data is available on the HTI for transmission across the serial link.

Example 7 may include the subject matter of example 6, wherein the serial interface is to configure the serial link based on having received the trace active signal; and send a link ready signal to the HTI via the PIPE interface after the serial link is configured.

Example 8 may include the subject matter of example 4, wherein the serial interface is to send a credit return signal to the HTI to indicate a credit release via the PIPE interface; and wherein the HTI is to send trace data to the serial interface via the PIPE interface when the HTI has at least one credit.

Example 9 is a system comprising a host machine comprising a host-side serial interface, and a memory for storing information. The system also includes a a device under test (DUT) connected to the host machine by a serial link. The DUT comprises a computing device, the computing device comprising a source of trace data, the trace data comprising information about the computing device to be used to debug errors associated with the computing device, a high-speed trace interface (HTI) to receive the trace data from the computing device, a serial interface comprising a port; a physical interface interconnecting the serial interface to the HTI. The HTI is to send the trace data to the serial interface through the physical interface. The serial interface to packetize the trace data into a packet format compliant with the serial interface, and send the trace data as a packet across the serial link to the host machine. The host machine to receive the trace data as a packet from across the serial link at the host-side serial interface; and store the trace data in the memory.

Example 10 may include the subject matter of example 9, wherein the host machine comprises debugging logic to perform debugging operations for the DUT using the trace data stored in the memory.

Example 11 may include the subject matter of any of examples 9-10, wherein the host machine comprises an HTI driver, the HTI driver to configure the HTI at the DUT to tunnel the trace data through the serial interface.

Example 12 may include the subject matter of any of examples 9-11, wherein the serial interface comprises one of a Thunderbolt 3 compliant serial interface or a universal serial bus (USB) 4 interface.

Example 13 may include the subject matter of any of examples 9-12, wherein the port comprises a Type-C port.

Example 14 may include the subject matter of any of examples 9-13, wherein the physical interface comprises a Physical Interface for Peripheral Component Interconnect Express (PIPE) interface.

Example 15 may include the subject matter of example 14, wherein the PIPE interface comprises a 64 bit bus, and wherein the HTI sends the trace data to the serial interface via the PIPE interface across the 64 bit bus.

Example 16 may include the subject matter of example 14, wherein the HTI is to transmit a trace active signal to the serial interface, the trace active signal to indicate that trace data is available on the HTI for transmission across the serial link.

Example 17 may include the subject matter of example 16, wherein the serial interface is to configure the serial link based on having received the trace active signal; and send a link ready signal to the HTI via the PIPE interface after the serial link is configured.

Example 18 may include the subject matter of example 14, wherein the serial interface is to send a credit return signal to the HTI to indicate a credit release via the PIPE interface; and wherein the HTI is to send trace data to the serial interface via the PIPE interface when the HTI has at least one credit.

Example 19 is a method comprising receiving, at a serial interface from a high-speed trace interface (HTI), trace data associated with a computing device across a Physical Interface for Peripheral Component Interconnect Express (PIPE) interface; creating a packet compliant with the serial interface, the packet to include the trace data; and sending the packet with the trace data across a serial link.

Example 20 may include the subject matter of example 19, further comprising receiving, at the serial interface, a trace active signal from the HTI, the trace active signal indicating that trace data is available to be sent across the serial link; configuring the serial link to send the trace data in response to receiving the trace active signal from the HTI; and send a link ready signal once the serial link is configured.

Example 21 is an apparatus comprising a trace data source, a high-speed trace interface (HTI), a Thunderbolt interface or USB4 interface, and a PIPE interface interconnecting the HTI and the Thunderbolt or USB4 interface. The HTI can send trace data through the PIPE interface to the Thunderbolt or USB4 interface for transmission to a host machine across a serial link, such as a TBT link or USB4 link. The PIPE interface can provide a means for tunneling trace data through TBT or USB4. The PIPE interface can include various signaling lanes to cause the TBT interface or USB4 interface to construct a protocol conforming packet that includes the trace data. The trace data is to be used at the host machine for debugging the apparatus.

What is claimed is:

1. An apparatus comprising:
a computing device, the computing device comprising a source of trace data, the trace data comprising information about the computing device to be used to debug errors associated with the computing device;
a high-speed trace interface (HTI) to receive the trace data from the computing device;
a serial interface comprising a port, the serial interface interconnected to the HTI by a physical interface;
the computing device to:
establish a host-to-host tunneling connection to a second computing device across a serial link via the port; and
tunnel the trace data from the HTI through the host-to-host tunneling connection to the second computing device
wherein the computing device comprises a processor, wherein the trace data relates to the processor, wherein the processor is to tunnel the trace data from the HTI through the host-to-host tunneling connection without storing the trace data in DRAM of the processor.

2. The apparatus of claim 1, wherein the serial interface comprises one of a Thunderbolt 3 compliant serial interface or a universal serial bus (USB) 4 interface.

3. The apparatus of claim 1, wherein the port comprises a Type-C port.

4. The apparatus of claim 1, wherein the physical interface comprises a Physical Interface for Peripheral Component Interconnect Express (PIPE) interface.

5. The apparatus of claim 4, wherein the PIPE interface comprises a 64 bit bus, and wherein the HTI sends the trace data to the serial interface via the PIPE interface across the 64 bit bus.

6. The apparatus of claim 4, wherein the HTI is to transmit a trace active signal to the serial interface, the trace active signal to indicate that trace data is available on the HTI for transmission across the serial link.

7. The apparatus of claim 6, wherein the serial interface is to:
configure the serial link based on having received the trace active signal; and
send a link ready signal to the HTI via the PIPE interface after the serial link is configured.

8. The apparatus of claim 4, wherein the serial interface is to send a credit return signal to the HTI to indicate a credit release via the PIPE interface; and
wherein the HTI is to send trace data to the serial interface via the PIPE interface when the HTI has at least one credit.

9. The apparatus of claim 1,
wherein the host-to-host tunneling connection at least partially continues when the processor loses power.

10. The apparatus of claim 1, wherein the processor is to tunnel the trace data from the HTI through the host-to-host tunneling connection without use of a trace box.

11. The apparatus of claim 1, wherein the serial interface enables and manages all link aspects while the HTI streams the trace data through the host-to-host tunneling connection.

12. The apparatus of claim 1, wherein the trace data comprises voltage regulator responses, ring transaction data, memory read/write data, on die package interconnect data, architecture event trace data, and trace of actual branches taken.

13. The apparatus of claim 1, wherein the physical interface comprises a Physical Interface for Peripheral Component Interconnect Express (PIPE) interface,
wherein the PIPE interface comprises:
a clock signal line from the HTI to the serial interface, wherein the clock signal line is to provide a clock signal to the serial interface;
a valid signal line from the HTI to the serial interface, wherein the valid signal line is to indicate whether data driven on a cycle is valid;
a reset signal line from the HTI to the serial interface, wherein the reset signal line is to provide a reset indication from the HTI to the serial interface;
a data bus from the HTI to the serial interface;
a credit return signal line from the serial interface to the HTI, wherein the credit return line is to indicate release of a credit;
a link ready signal line from the serial interface to the HTI, wherein the link ready signal line indicates to the HTI that the host-to-host tunneling connection is ready; and
a trace active signal line from the HTI to the serial interface, wherein the trace active signal is to indicate to the serial interface that the HTI has trace data to send on the host-to-host tunneling connection.

* * * * *